United States Patent [19]
Kilgore et al.

[11] 3,809,914
[45] May 7, 1974

[54] STARTING SYSTEM FOR POWER PLANTS

[75] Inventors: Lee A. Kilgore, Export; Robert E. G. Ratcliffe; Henry L. Smith, both of Monroeville; Bernard S. Strait, Jr., Pittsburgh, all of Pa.

[73] Assignee: Westinghouse Electric Corporation, Pittsburgh, Pa.

[22] Filed: July 13, 1972

[21] Appl. No.: 271,427

[52] U.S. Cl. .................................. 290/38, 290/32
[51] Int. Cl. ............................................ F02n 11/08
[58] Field of Search ............ 290/36, 38, 46, 11, 16, 290/21, 52; 318/227, 230

[56] References Cited
UNITED STATES PATENTS

| | | | |
|---|---|---|---|
| 3,271,579 | 9/1966 | Erisman | 290/38 |
| 2,339,903 | 1/1944 | Alexander | 290/36 |
| 2,395,443 | 2/1946 | Franenfelder et al. | 290/32 |
| 3,264,482 | 8/1966 | Clark et al. | 290/38 |
| 3,591,844 | 7/1971 | Schoenbeck | 290/52 |
| 2,374,060 | 4/1945 | Weybren | 290/16 |

*Primary Examiner*—G. R. Simmons
*Attorney, Agent, or Firm*—G. H. Telfer

[57] ABSTRACT

A starting system for power plants having a prime mover which is not self-starting, such as a gas turbine, or for other synchronous machines which are not self-starting. The generator or other synchronous machine has an exciter which is designed to operate as a wound rotor induction motor for starting and as a normal exciter thereafter.

5 Claims, 3 Drawing Figures

3,809,914

STARTING SYSTEM FOR POWER PLANTS

BACKGROUND OF THE INVENTION

The present invention relates to electrical generating plants, and more particularly to plants which are not self-starting. Certain types of prime movers used for driving generators, such as gas turbines, are not self-starting and must be provided with some means for starting the plant. In the conventional arrangement, starting motors are provided for driving the gas turbine to accelerate it from standstill to a speed at which the combustor can be ignited and at which the operation becomes self-sustaining. In the case of relatively large plants, such as those used on electric utility systems, the required motors with their accessories become quite large and expensive. For example, in a plant with a rated output in the range of 50 to 60 megawatts, a starting motor or motors aggregating from 1200 to 1500 horsepower are required. In addition suitable control equipment must be provided for the motors, and torque converters with the necessary cooling system, speed increasing gears, and clutches are also required for the complete starting system. It is apparent that the entire starting system, including the motors themselves and the necessary accessories, is a large and expensive assembly of equipment and requires additional foundation costs and enclosure costs for the complete plant as well as involving extra costs of alignment and assembly. Thus the necessity of providing starting motors has added very substantially to the cost of large gas turbine power plants.

It has been proposed to start prime movers which are not self-starting by using the generator itself as a starting motor, as in the patents to Erikson U.S. Pat. No. 3,132,297 and Schonebeck et al. U.S. Pat. No. 3,591,844 for example. This has been done with relative success with small machines, such as aircraft generators driven by internal combustion engines, but it is neither practical nor desirable in the case of large synchronous generators such as are used in plants supplying power to utility systems.

SUMMARY OF THE INVENTION

In accordance with the present invention a starting system is provided for power plants driven by a non-self-starting prime mover which eliminates the necessity for separate starting motors and associated auxiliary equipment. In accordance with the invention the exciter for the main generator is designed so that it can be operated as a variable speed induction motor to start the plant and accelerate it to the speed at which its operation is self-sustaining. The exciter is then operated as a normal exciter supplying field current to the main generator during operation of the plant. In this way no separate starting motor with its accessories is required, since the exciter is a necessary part of the plant and can readily be designed to operate as a motor during the relatively short starting period. This starting system is of course not limited to gas turbine plants but is applicable to any synchronous dynamoelectric machines which require separate starting means, such as large synchronous condensers.

BRIEF DESCRIPTION OF DRAWINGS

The invention will be more fully understood from the following detailed description, taken in connection with the accompanying drawings, in which.

DESCRIPTION OF PREFERRED EMBODIMENTS

Figure 1:
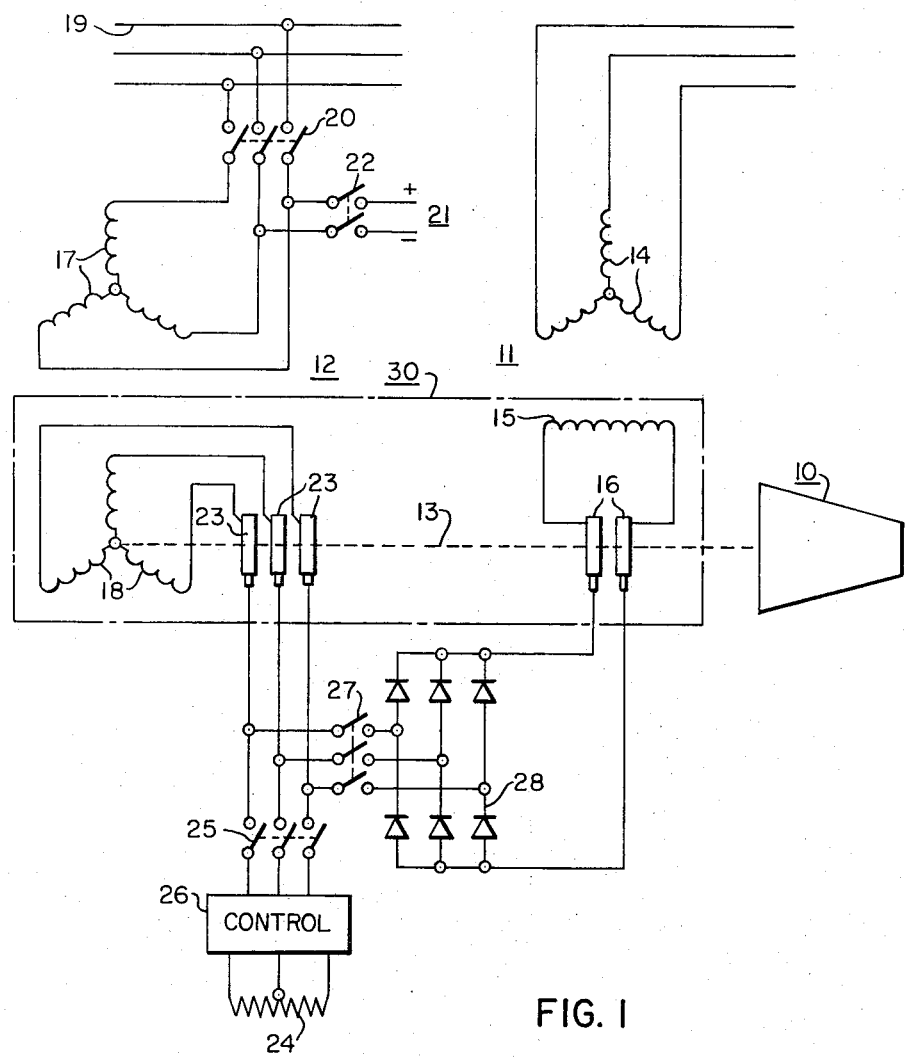
FIGS. 1, 2 and 3 are schematic diagrams showing certain preferred embodiments of the invention.

One embodiment of the invention is shown schematically in FIG. 1. As there illustrated, the invention is embodied in a power plant driven by a prime mover, shown as a gas turbine 10, which drives a synchronous generator 11 and an exciter 12. The gas turbine 10 may be taken as representing any type of prime mover which is not self-starting, and is shown driving a shaft indicated at 13 which drives the main generator 11 and exciter 12. The generator 11 may be any desired type of synchronous alternating current generator and is shown as having a three-phase armature winding 14 which is carried on a stator member in the usual way. The generator 11 also has a rotor member on the shaft 13 carrying a field winding 15 of any suitable type connected to slip rings 16.

The exciter 12 has a three-phase winding 17 on its stator member and has a rotor member on the shaft 13 which also carries a three-phase winding 18. The rotor members of the generator 11 and exciter 12 may be on a common shaft 13 or may be coupled together for rotation as a unitary rotating element 30. The exciter 12 is designed to be capable of operation as a wound rotor induction machine and is therefore provided with three-phase windings on both stator and rotor having the same number of poles. Since it is usually necessary to accelerate a gas turbine to approximately 2400 rpm for starting, the exciter 12 should be designed to bring the turbine up to that speed, and preferably is designed as a 3600 rpm machine, which would normally be the rated speed of the generator.

In order to permit operation of the machine 12 as either a motor or an exciter, it is arranged to be energized with alternating current from any suitable three-phase source 19 by means of a switch 20 or to be excited with direct current from any suitable source 21 by means of a switch 22. The direct current excitation may be supplied through a voltage regulator in the usual manner, or from any other suitable source, and the winding 17 is arranged so that when direct current excitation is applied to two of the leads, as shown, a properly distributed symmetrical magnetic field will be provided in the machine. Any suitable type of switching means may be provided, either manual as shown or automatically controlled in any desired manner, and the switches 20 and 22 may be interlocked so that only one can be closed at a time.

The three-phase winding 18 of the rotor is wound with the same number of poles as the stator winding 17 and is disposed to cooperate with the stator winding for operation as an induction motor. The winding 18 is connected to slip rings 23 on shaft 13 and an external resistor 24 of any suitable type is provided for connection to the winding 18 by means of the slip rings 23. A switch 25 is provided for connecting the resistor 24 to the slip rings and a suitable control 26 of any usual or desired type is provided for varying the effective resistance 24 to control the speed and acceleration of the machine 12 when it is running as a motor.

The rotor winding 18 of the machine 12 is also connectable through a switch 27 to a rectifier assembly 28 of any suitable type. The rectifier 28 is shown as a static rectifier preferably consisting of semiconductor diodes connected in a three-phase bridge, and the output leads of the rectifier 28 are connected to the generator field winding 15 by means of the slip rings 16. The switches 25 and 27 may be manual switches as shown or they may be controlled in any desired manner, and they are preferably also interlocked so that only one can be closed at a time.

The operation of starting the plant should now be apparent. Starting at standstill, when it is desired to put the plant into operation, the machine 12 is initially operated as a motor. For this purpose, the switch 20 is closed to energize the stator winding with alternating current and the switch 25 is closed to connect the resistor 24 to the rotor winding 18, the switches 25 and 27 being open. The machine 12 will therefore start as a wound rotor induction motor driving the generator 11 and the gas turbine 10. The speed of the machine 12 is controlled by the control means 26, which is intended to represent any usual or desired type of induction motor control, and the resistance 24 is gradually reduced to accelerate the motor 12 to the desired speed which, as indicated above, is usually approximately 2400 rpm. When this speed is attained, ignition of the gas turbine 10 can be effected and the turbine 10 will begin to run as a self-sustaining prime mover driving the generator 11 and exciter 12. When this mode of operation is obtained, the machine 12 is converted to operate as an exciter by opening switches 20 and 25 and closing the switches 22 and 27. The stator winding 17 is then excited with direct current to serve as a generator field winding, and the alternating current output generated in the rotor winding 18 is rectified by the rectifier 28 and supplied as direct current excitation to the main generator field winding 15. The main generator 11 is then in its normal operating mode, and when the turbine 10 reaches the rated operating speed, the generator 11 can be synchronized with the line by usual means (not shown) and put into normal operation.

It will be seen that a starting system is thus provided which requires no starting motors and no rotating equipment external to the rotating member 30 of the generator and exciter, the only external equipment required being the control for motor operation of the exciter and the rectifier 28, which are static devices of relatively compact construction. The expense and space requirements of an external starting motor with the necessary auxiliary equipment are therefore eliminated.

Figure 2:
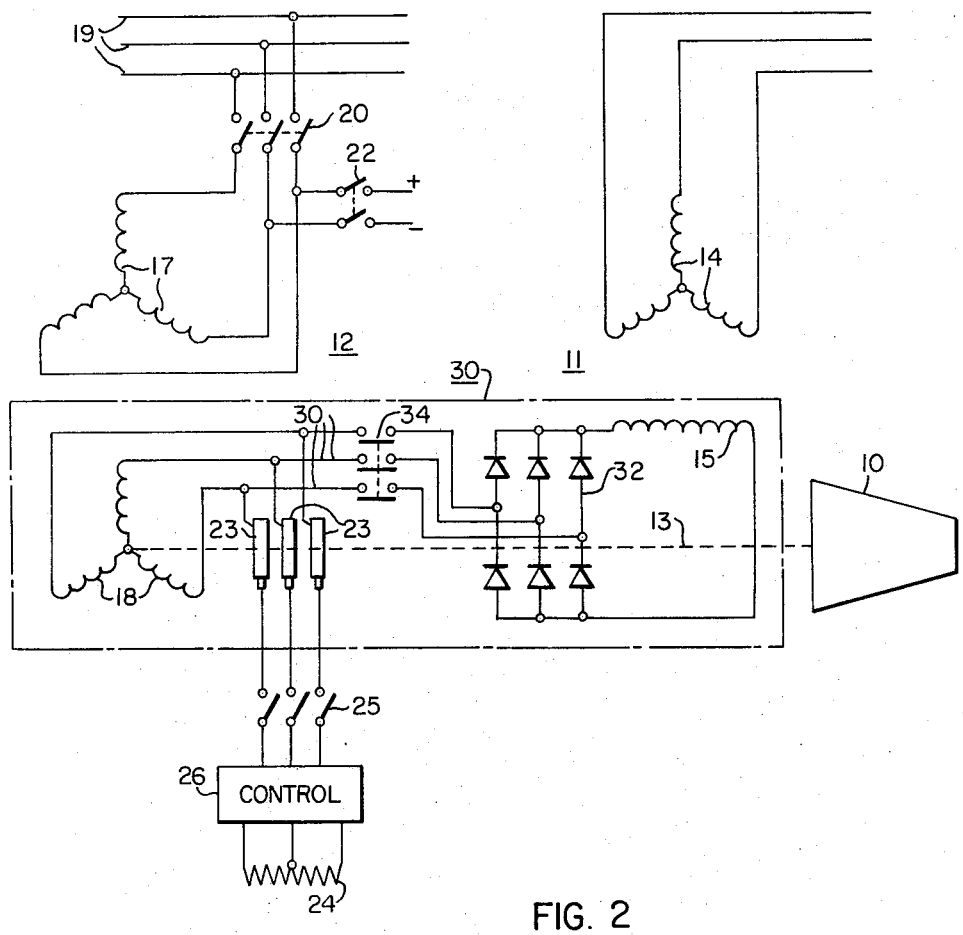

A modified embodiment of the invention is shown in FIG. 2 which provides for brushless excitation of the generator. The system shown in this figure is generally similar to that of FIG. 1 and the same reference numerals are utilized to identify corresponding elements. In this embodiment of the invention, the exciter 12 may be the same as in FIG. 1 and its operation as a variable speed induction motor for starting is the same as described above in connection with FIG. 1. In the FIG. 2 embodiment, however, the machine 12 operates as a brushless exciter during normal operation and for this purpose a rectifier assembly 32 is mounted on the shaft 13 for rotation with the shaft. The rectifier assembly 32 may be any suitable type of rotating rectifier as utilized in brushless exciters, such as that shown in a U.S. Pat. to Hoover No. 3,371,235 for example. The rectifier 32 is connected to the rotor winding 18 of the exciter 12 by means of leads 30 which extend along shaft 13 and are connected to the rectifier assembly by switching means 34 which may be of any suitable type. As illustrated diagrammatically in FIG. 2, the switch 34 may be a centrifugal switch which will close and connect the rectifier to the winding 18 when the shaft 13 has reached a predetermined speed at which the turbine 10 should start to run. If desired, however, more sophisticated switching means might be utilized such as thyristors or other solid state switches with suitable firing control to complete the circuit at the desired time. When the switch 34 is closed, the external switch 25 should of course be opened as previously described, and in this embodiment of the invention a brush lifting mechanism of any usual type is preferably utilized to lift the brushes from the slip rings 23 during normal operation. It will be seen that the operation of this embodiment of the invention is the same as that of the embodiment of FIG. 1 except that a brushless exciter is utilized.

A possible alternative arrangement to that of FIG. 2 which would eliminate the necessity of switching means on the rotor would be to eliminate the switch 34 and connect the rotating rectifier 32 directly to the winding 18. The rectifier would thus be in the circuit at all times which would result in some small unbalance during the starting period, but the machine could readily be designed to tolerate this unbalance during starting which is a relatively short period as compared to the time of normal operation. In this way the necessity of switching on the rotor could be avoided.

Figure 3:
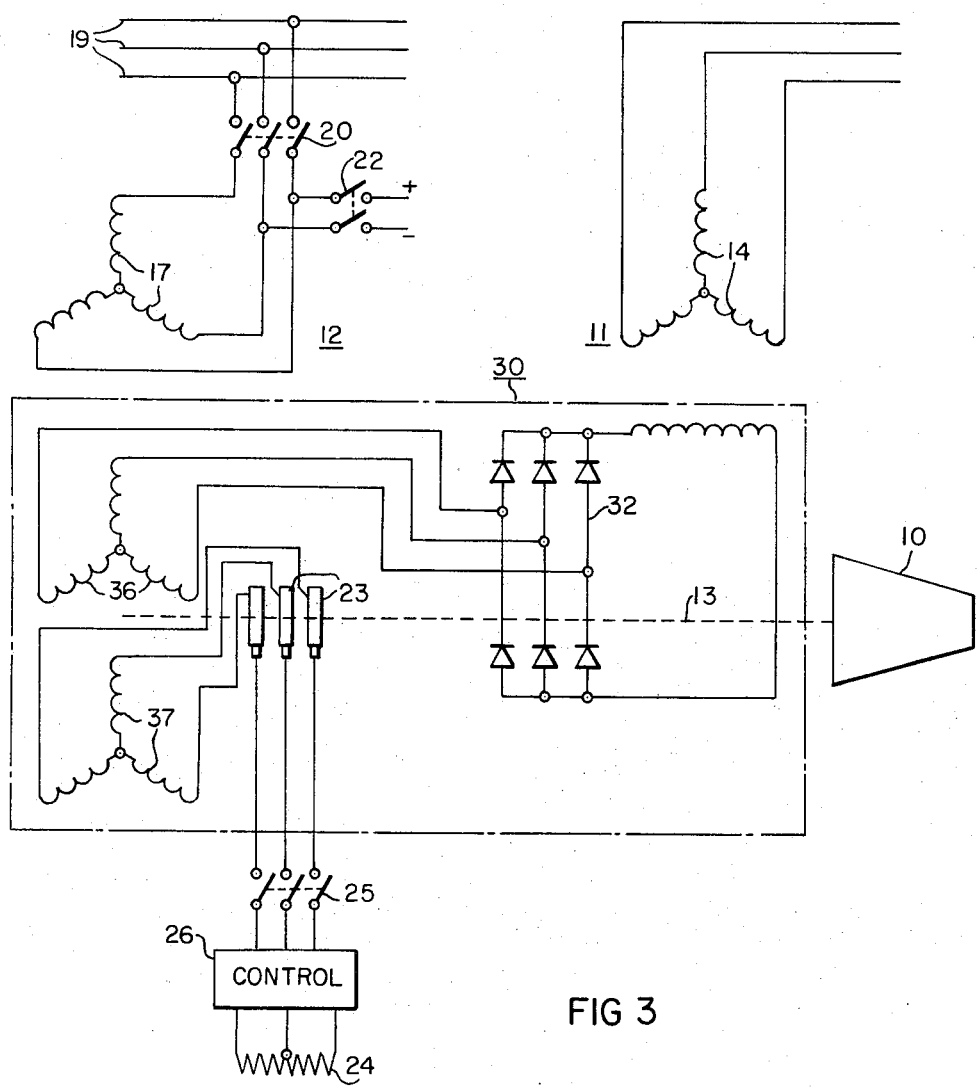

A further alternative for avoiding switching on the rotor is shown in FIG. 3. As there shown, the rotor winding of the machine 12 is divided into two separate three-phase windings 36 and 37. At least one rotor coil per phase is included in the winding 36 which is connected directly to the rotating rectifier 32. The winding 37 is connected to the slip rings 23 and the machine 12 is started as previously described as a wound rotor induction motor. After it is brought up to speed the switch 25 is opened and the stator winding 17 excited with direct current. The alternating current output then generated in the winding 36 is rectified by the rectifier 32 and applied to the field winding 15 of the main generator 11 as previously described.

It will be obvious that other modifications and variations of the basic system described above are possible. Thus, for example, the windings of the machine 12 may be designed for reconnection to different numbers of poles so that the machine will start as a two-pole, 3600 rpm machine, and after the turbine has started and the plant is ready for normal operation the exciter winding can be reconnected for a different number of poles to provide a higher frequency to the rectifier which is usually desirable. It would also be possible to eliminate the direct current excitation of the exciter 12 and excite the stator winding 17 with alternating current during normal operation, so that the machine would function as a rotating transformer with voltage controlled by varying the alternating current excitation. It will be seen that with any of these modifications the basic principle is the same, and that by using the exciter as a starting motor for bringing the gas turbine up to speed the necessity for external starting motors and their auxiliaries is avoided and a very substantial reduction in the cost and space requirements of gas turbine power plants is achieved. It will also be seen that the usefulness of the invention is not restricted to starting gas turbines, but it can be used in connection with any synchronous machine which is not self-starting and requires external starting means, such as large synchronous condensers for example.

We claim:

1. In combination, a synchronous dynamoelectric machine having a rotor member carrying a field winding, a second dynamoelectric machine having a stator member carrying a stator winding and a rotor member carrying a rotor winding, said rotor members being mechanically connected together for rotation as a unit, means for energizing the stator winding of said second machine with alternating current, means for connecting external resistance means to the rotor winding of the second machine to enable operation of the second machine as a variable speed motor when its stator winding is energized with alternating current, means for alternatively energizing the stator winding of the second machine with direct current for operation of the second machine as an alternating current generator, means for rectifying the output of the rotor winding of the second machine when it is being operated as a generator, means for applying said rectified output to the field winding of said synchronous machine, and a prime mover mechanically connected in driving relation to said rotor members.

2. The combination of claim 1 in which the prime mover is a gas turbine.

3. The combination of claim 1 wherein: said means for rectifying the output of the rotor winding of the second machine and said means for applying said rectified output to the field winding of said synchronous machine comprise elements that are located outside of said rotatable unit that includes said rotors and are connected to said rotor windings through rotatable electrical connections.

4. The combination of claim 1 wherein: said means for rectifying the output of the rotor winding of the second machine and said means for applying said rectified output to the field winding of said synchronous machine comprise elements that are located within said rotatable unit that includes said rotors.

5. The combination of claim 4 wherein: said rotor of said second machine carries a winding of first and second electrically separate portions, said first portion is connected to said means for rectifying the output of the rotor winding, and said means for connecting external resistance means to the rotor winding is connected to said second portion of said winding.

* * * * *